(12) United States Patent  
Suzuki

(10) Patent No.: US 7,174,248 B2
(45) Date of Patent: Feb. 6, 2007

(54) SAFE DRIVING ASSISTING APPARATUS, SAFE DRIVING ASSISTING SERVER, AND SAFE DRIVING ASSISTING SYSTEM

(75) Inventor: Masahiro Suzuki, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

(21) Appl. No.: 10/704,726

(22) Filed: Nov. 10, 2003

(65) Prior Publication Data

US 2004/0128063 A1 Jul. 1, 2004

(30) Foreign Application Priority Data

Nov. 11, 2002 (JP) ............................. 2002-327025

(51) Int. Cl.
*B60T 7/12* (2006.01)
(52) U.S. Cl. ...................... 701/96; 701/96; 342/357.08
(58) Field of Classification Search ................. 701/23, 701/45, 96, 216, 117, 300, 301, 213; 342/357.06, 342/357.08, 357.09; 340/436
See application file for complete search history.

(56) References Cited

U.S. PATENT DOCUMENTS

| | | | |
|---|---|---|---|
| 5,128,669 A * | 7/1992 | Dadds et al. | ................ 340/901 |
| 5,504,482 A | 4/1996 | Schreder | |
| 6,405,132 B1 | 6/2002 | Breed et al. | |
| 7,031,837 B1 * | 4/2006 | Foust | ......................... 701/301 |
| 7,062,374 B1 * | 6/2006 | Walters et al. | ............... 701/200 |
| 7,072,764 B2 * | 7/2006 | Donath et al. | ............... 701/200 |
| 7,082,359 B2 * | 7/2006 | Breed | .......................... 701/36 |

FOREIGN PATENT DOCUMENTS

| | | |
|---|---|---|
| DE | 196 38 703 | 4/1998 |
| EP | 0 840 138 | 5/1998 |
| WO | 01/55744 | 8/2001 |

* cited by examiner

*Primary Examiner*—Richard M. Camby
(74) *Attorney, Agent, or Firm*—Pearne & Gordon LLP

(57) ABSTRACT

Herein disclosed is a safe driving assisting apparatus for assisting a vehicle driver in safely driving a vehicle, comprising: attention status information generating means for generating one or more attention status information elements each having an attention position and an attention condition; information providing means for providing the vehicle driver with the attention status information elements generated by said attention status information generating means; information obtaining means for obtaining current vehicle status information having a current position and a current condition; judging means for judging whether or not the vehicle driver's attention is to be attracted on the basis of the current vehicle status information obtained by the information obtaining means and each of the attention status information elements generated by said attention status information generating means; and controlling means for controlling the information providing means to have the information providing means provide the vehicle driver with one of the attention status information elements generated by said attention status information generating means when the judging means judges that the vehicle driver's attention is to be attracted.

19 Claims, 8 Drawing Sheets

SAFE DRIVING ASSISTING APPARATUS, SAFE DRIVING ASSISTING SERVER, AND SAFE DRIVING ASSISTING SYSTEM

BACKGROUND OF THE INVENTION

1. Field of the Invention

The present invention relates to a safe driving assisting apparatus, a safe driving assisting server, and a safe driving assisting system for assisting a vehicle driver in safely driving a vehicle, and more particularly to a safe driving assisting apparatus, a safe driving assisting server, and a safe driving assisting system for providing the vehicle driver with attention information to attract vehicle driver's attention when and where the vehicle driver is required to pay careful attention to driving.

2. Description of the Related Art

Up until now, there have been proposed a wide variety of conventional driving assisting apparatuses each of which notifies a vehicle driver of not only the current location of the vehicle but also attention information to attract vehicle driver's attention. The conventional driving assisting apparatus of this type is disclosed in Japanese Patent Laid-Open Publication No. H09-14976 and shown in FIG. 8. The conventional driving assisting apparatus 700 is shown in FIG. 8 as comprising a storage unit 710, a Global Positioning System, hereinlater referred to as "GPS unit" 780, a control unit 750, and a display unit 730. The storage unit 710 is adapted to store therein a position where the vehicle driver is required to pay careful attention, hereinlater referred to as "attention position". The storage unit 710 is operative to store therein as the attention position a dangerous location such as, for example, a sharp turn, a steep decent, a punishing road, or the like. The GPS unit 780 is adapted to obtain a current position of the vehicle. The display unit 730 is adapted to notify the vehicle driver of attention information to attract driver's attention. The control unit 750 is adapted to control the display unit 730 to have the display unit 730 notify the vehicle driver of the attention information when the vehicle approaches to the attention position. The conventional driving assisting apparatus 700 is operative to notify the vehicle driver of the attention information whenever the vehicle approaches to the attention position to assist the vehicle driver in safely driving the vehicle as long as the vehicle driver pays attention to driving by looking at the attention information displayed by the display unit 730.

The conventional driving assisting apparatus 700 thus constructed as previously mentioned, however, encounters a drawback that the vehicle driver tends to overlook or neglect the attention information although the display unit 730 notifies the vehicle driver of the attention information whenever the vehicle approaches to the attention position. The vehicle driver in general knows where he or she drives, and can anticipate when the vehicle approaches to the attention position such as, for example, a sharp turn, a steep decent, a punishing road, or the like. A traffic accident is prone to occur under an adverse driving condition such as, for example, night, snow, rain, or the like. The vehicle driver is required to pay careful attention to driving and focus on the attention information especially when and where driving under such an adverse driving condition. The fact that the vehicle driver tends to overlook or neglect the attention information is attributed to the fact that the conventional driving assisting apparatus 700 is operative to notify the vehicle driver of the attention information only when the vehicle approaches to the attention position without considering driving conditions under which the vehicle driver is driving the vehicle, thereby disregarding the driving conditions when and where the vehicle driver is required to pay careful attention to driving.

SUMMARY OF THE INVENTION

In view of the foregoing drawback, it is an object of the present invention to provide a safe driving assisting apparatus which provides the vehicle driver with attention information to attract vehicle driver's attention when and where the vehicle driver is required to pay careful attention to driving, thereby ensuring that the vehicle driver does not neglect the attention information.

It is another object of the present invention to provide a safe driving assisting server which provides the vehicle driver with attention information to attract vehicle driver's attention when and where the vehicle driver is required to pay careful attention to driving, thereby ensuring that the vehicle driver does not neglect the attention information.

It is a further object of the present invention to provide a safe driving assisting system which provides the vehicle driver with attention information to attract vehicle driver's attention when and where the vehicle driver is required to pay careful attention to driving, thereby ensuring that the vehicle driver does not neglect the attention information.

In accordance with a first aspect of the present invention, there is provided a safe driving assisting apparatus for assisting a vehicle driver in safely driving a vehicle, comprising: attention status information generating means for generating one or more attention status information elements each having an attention position and an attention condition; information providing means for providing the vehicle driver with the attention status information elements generated by the attention status information generating means; information obtaining means for obtaining current vehicle status information having a current position and a current condition; judging means for judging whether or not the vehicle driver's attention is to be attracted on the basis of the current vehicle status information obtained by the information obtaining means and each of the attention status information elements generated by the attention status information generating means; and controlling means for controlling the information providing means to have the information providing means provide the vehicle driver with one of the attention status information elements generated by the attention status information generating means when the judging means judges that the vehicle driver's attention is to be attracted.

In the above mentioned safe driving assisting apparatus, the judging means may include a position judging section for judging whether or not the distance between the current position of the current vehicle status information obtained by the information obtaining means and the attention position of each of the attention status information elements is less than a predetermined threshold distance, and a condition judging section for judging whether or not the vehicle driver's attention is to be attracted on the basis of the current condition of the current vehicle status information obtained by the information obtaining means and the attention condition of the attention status information element generated by the attention status information generating means when the position judging section judges that the distance between the current position of the current vehicle status information obtained by the information obtaining means and the attention position of the attention status information element is less than a predetermined threshold distance. The controlling means may be operative to control the information providing means to have the information providing means provide the vehicle driver with the attention status information element generated by the attention status information generating means when the judging means judges that the vehicle driver's attention is to be attracted.

In the above mentioned safe driving assisting apparatus, the attention status information generating means may be operative to generate an attention time and an attention weather as part of the attention condition, the information obtaining means may be operative to obtain a current time and a current weather as part of the current condition, and the condition judging section may be operative to judge whether or not the vehicle driver's attention is to be attracted in consideration of the current time and the current weather of the current vehicle status information obtained by the information obtaining means and the attention time and the attention weather of the attention status information element generated by the attention status information generating means.

The attention status information generating means may be operative to generate an attention vehicle condition as part of the attention condition, the information obtaining means may be operative to obtain a current vehicle condition as part of the current condition, and the condition judging section may be operative to judge whether or not the vehicle driver's attention is to be attracted in consideration of the current vehicle condition of the current vehicle status information obtained by the information obtaining means and the attention vehicle condition of the attention status information element generated by the attention status information generating means.

The information providing means may include a speaker unit for acoustically outputting a sound indicative of the attention status information element. The information providing means may include a display unit for displaying character information indicative of the attention status information element. The information providing means may include a display unit for displaying the attention position on a road map. The attention position may include a position where a vehicle encountered a dangerous situation. The attention time of the attention condition may include an attention time when the vehicle encountered the dangerous situation. The attention weather of the attention condition may include weather when the vehicle encountered the dangerous situation.

In accordance with a second aspect of the present invention, there is provided a safe driving assisting server for assisting a vehicle driver in safely driving a vehicle, comprising: storage means for storing therein one or more attention status information elements each having an attention position and an attention condition; and attention information transmitting means for transmitting the attention status information elements stored in the storage means. The storage means may be operative to store therein an attention time and an attention weather as part of the attention condition. The storage means may be operative to store therein an attention vehicle condition as part of the attention condition.

In accordance with a third aspect of the present invention, there is provided a safe driving assisting system for assisting a vehicle driver in safely driving a vehicle, comprising: a safe driving assisting server for assisting a vehicle driver in safely driving a vehicle, including: storage means for storing therein one or more attention status information elements each having an attention position and an attention condition; and attention information transmitting means for transmitting the attention status information elements stored in the storage means; and a safe driving assisting apparatus including: attention information obtaining means for obtaining the attention status information elements transmitted by the attention information transmitting means of the safe driving assisting server; information providing means for providing the vehicle driver with the attention status information elements obtained by the attention information obtaining means; information obtaining means for obtaining current vehicle status information having a current position and a current condition; judging means for judging whether or not the vehicle driver's attention is to be attracted on the basis of the current vehicle status information obtained by the information obtaining means and each of the attention status information elements obtained by the attention information obtaining means; and controlling means for controlling the information providing means to have the information providing means provide the vehicle driver with one of the attention status information elements obtained by the attention information obtaining means when the judging means judges that the vehicle driver's attention is to be attracted.

The storage means of the safe driving assisting server may be operative to store therein an attention time and an attention weather as part of the attention condition. The storage means of the safe driving assisting server may be operative to store therein an attention vehicle condition as part of the attention condition. The information providing means may include a speaker unit for acoustically outputting a sound indicative of the attention status information element. The information providing means may include a display unit for displaying character information indicative of the attention status information element. The information providing means may include a display unit for displaying the attention position of the attention status information element on a road map.

BRIEF DESCRIPTION OF THE DRAWINGS

The present invention and many of the attendant advantages thereof will be better understood from the following detailed description when considered in connection with the accompanying drawings, wherein.

DESCRIPTION OF THE PREFERRED EMBODIMENTS

The following description will be directed to preferred embodiments of the safe driving assisting apparatus according to the present invention with reference to FIGS. 1 through 7.

Figure 1:
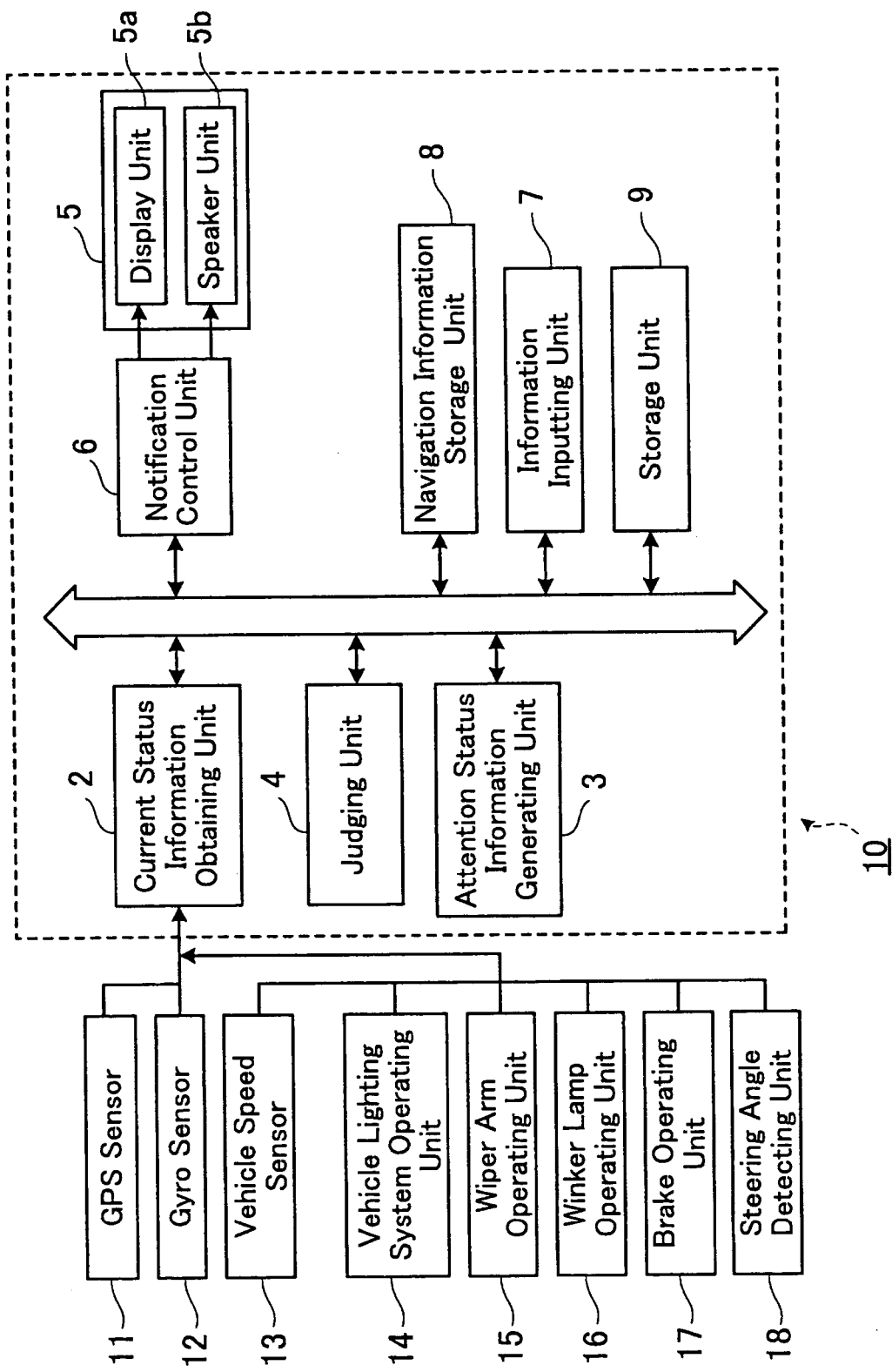
FIG. 1 is a block diagram of a first preferred embodiment of a safe driving assisting apparatus according to the present invention.
Figure 2:
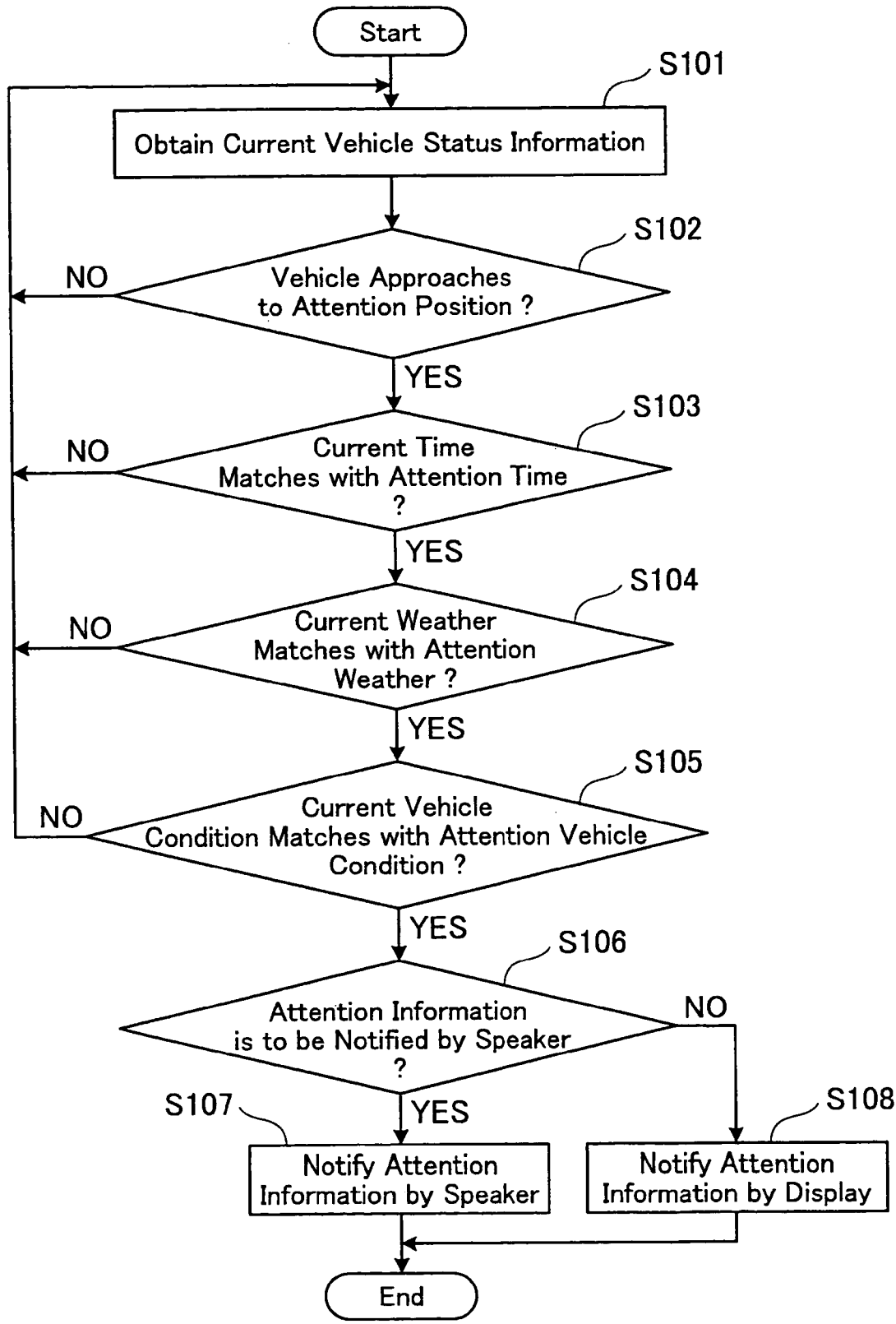
FIG. 2 is a flowchart showing the process performed by the first embodiment of the safe driving assisting apparatus according to the present invention.
Figure 3:
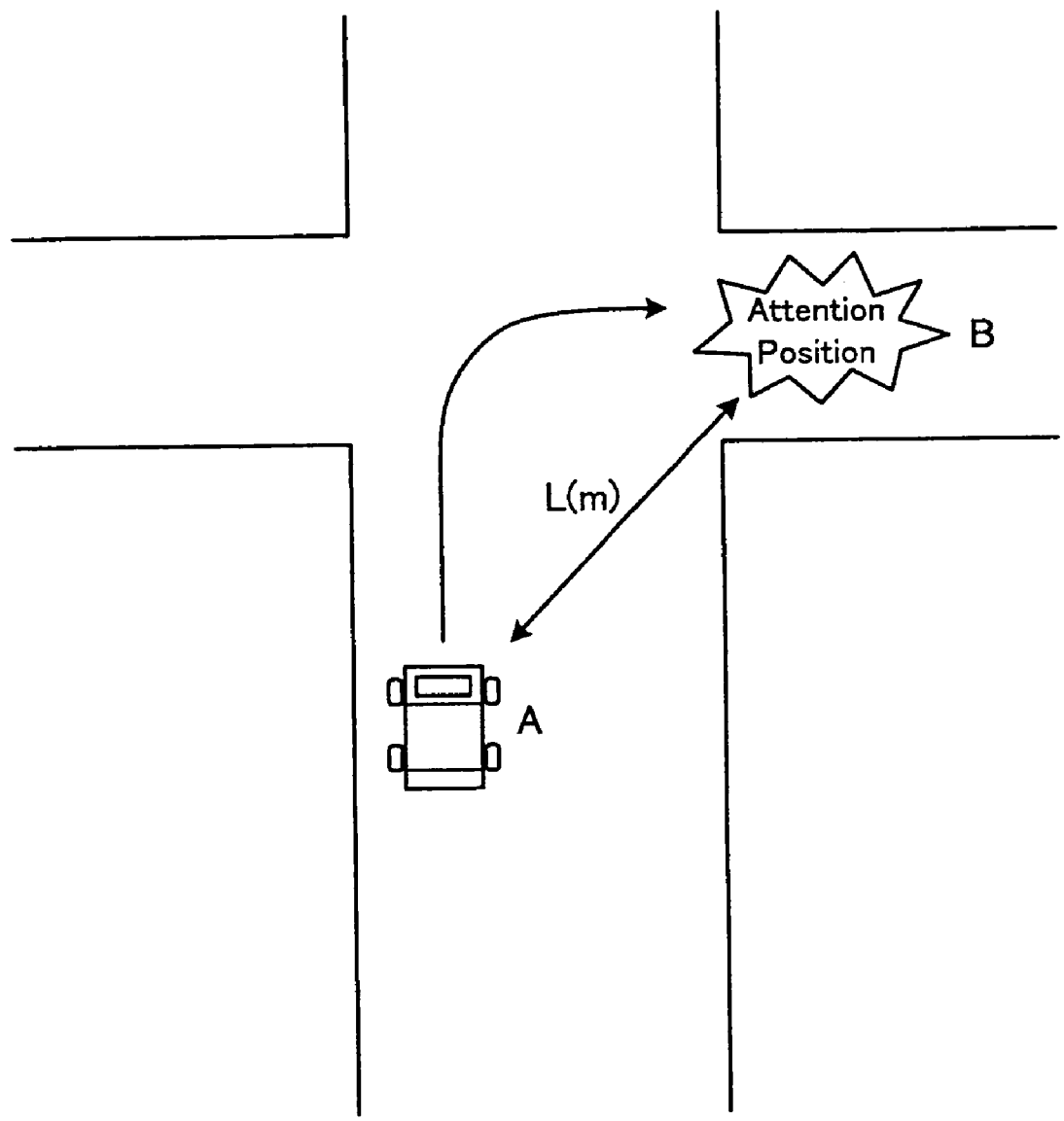
FIG. 3 is a schematic diagram showing a relation between a current position and an attention position.

Referring to FIGS. 1 through 3 of the drawing, there is shown a first preferred embodiment of a safe driving assisting apparatus 10 according to the present invention.

The construction of the safe driving assisting apparatus 10 according to the present invention will firstly be described.

The first embodiment of the safe driving assisting apparatus 10 for assisting a vehicle driver in safely driving a vehicle is shown in FIG. 1 as comprising: attention status information generating means constituted by an attention status information generating unit 3 for generating one or more attention status information elements each having an attention position and an attention condition, information providing means constituted by a notifying unit 5 for providing the vehicle driver with the attention status information elements generated by the attention status information generating unit 3, information obtaining means constituted by a current status information obtaining unit 2 for obtaining current vehicle status information having a current position and a current condition, judging means constituted by a judging unit 4 for judging whether or not the vehicle driver's attention is to be attracted on the basis of the current vehicle status information obtained by the current status information obtaining unit 2 and each of the attention status information elements generated by the attention status information generating unit 3, and controlling means constituted by a notification control unit 6 for controlling the notifying unit 5 to have the notifying unit 5 provide the vehicle driver with one of the attention status information elements generated by the attention status information generating unit 3 when the judging unit 4 judges that the vehicle driver's attention is to be attracted. Each of the attention status information elements has an attention position, an attention condition, and, if necessary, a notification instruction, which will be described later.

The current status information obtaining unit 2 is electrically connected with a GPS sensor 11 for receiving a GPS signal indicative of a position of the vehicle, a Gyro sensor 12 for detecting a direction of the vehicle, and a vehicle speed sensor 13 for detecting a vehicle speed at which the vehicle is driving.

The current status information obtaining unit 2 forming part of the safe driving assisting apparatus 10 thus constructed is operative to obtain a current position of the vehicle on the basis of the GPS signal indicative of the position of the vehicle received by the GPS sensor 11, the direction of the vehicle detected by the Gyro sensor 12, and the vehicle speed of the vehicle detected by the vehicle speed sensor 13. The current position of the vehicle partly constitutes the current vehicle status information.

The current status information obtaining unit 2 is further electrically connected with a vehicle lighting system operating unit 14 for operating a vehicle lighting system, not shown, to selectively switch on and off the vehicle lighting system. The vehicle lighting system operating unit 14 is operative to switch on the vehicle lighting system under the condition that it becomes dark. This means that the vehicle lighting system operating unit 14 is operative to switch on the vehicle lighting system during the evening or night hours.

The current status information obtaining unit 2 forming part of the safe driving assisting apparatus 10 thus constructed is operative to obtain as part of the current condition a current time on the basis of the operation of the vehicle lighting system operating unit 14. The current time of the current condition partly constitutes the current vehicle status information.

The current status information obtaining unit 2 is further electrically connected with a wiper arm operating unit 15 for operating a wiper arm, not shown, to selectively switch on and off the wiper arm. The wiper arm operating unit 15 is operative to switch on the wiper arm under the condition that it rains.

The current status information obtaining unit 2 forming part of the safe driving assisting apparatus 10 thus constructed is operative to obtain as part of the current condition a current whether on the basis of the operation of the wiper arm operating unit 15. The current weather of the current condition partly constitutes the current vehicle status information.

The current status information obtaining unit 2 is further electrically connected with a winker lamp operating unit 16 for operating a winker lamp, not shown, a brake operating unit 17 for operating a brake mechanism, not shown, and a steering angle detecting unit 18 for detecting the operation of a steering wheel, not shown. The winker lamp operating unit 16 is operative to operate the winker lamp under the condition that the vehicle makes a turn. The brake operating unit 17 is operative to operate the brake mechanism under the condition that the vehicle stops. The steering angle detecting unit 18 is operative to detect a steering angle when the vehicle driver turns the steering wheel.

The current status information obtaining unit 2 forming part of the safe driving assisting apparatus 10 thus constructed is operative to obtain as part of the current condition a current vehicle condition on the basis of the operations of the winker lamp operating unit 16 and the brake operating unit 17, the vehicle speed detected by the vehicle speed sensor 13, and the steering angle detected by the steering angle detecting unit 18. The word "vehicle condition" appearing hereinabove includes a vehicle speed, a steering angle, the operations of the winker lamp and the brake mechanism, or any combination thereof. The current vehicle condition of the current condition partly constitutes the current vehicle status information.

As will be seen from the foregoing description, it is to be understood that the current status information obtaining unit 2 is operative to obtain current vehicle status information. The current vehicle status information has a current position and a current condition including a current time, a current weather, and a current vehicle condition. It is needless to mention that the current status information obtaining unit 2 may be electrically connected with sensors other than the aforementioned elements so that the current status information obtaining unit 2 can accurately and extensively obtain the current vehicle status information.

The safe driving assisting apparatus 10 further comprises an instruction inputting unit 7 for inputting an instruction signal from an operator such as, for example, a vehicle driver, or the like.

The operator can have the instruction inputting unit 7 input an instruction signal therein when and where the vehicle encounters a dangerous situation. In response to the instruction signal inputted by the instruction inputting unit 7, the attention status information generating unit 3 is operative to generate an attention status information element on the basis of the current vehicle status information obtained by the current status information obtaining unit 2. It is needless to mention that the attention status information generating unit 3 may be operative to automatically generate an attention status information element on the basis of the current vehicle status information obtained by the current status information obtaining unit 2 without the instruction signal inputted by the instruction inputting unit 7. This means that the attention status information generating unit 3 may be operative to automatically generate an attention status information element when, for example, the current status information obtaining unit 2 detects that the brake operating unit 17 suddenly operates the brake mechanism. Thus, the attention status information generating unit 3 is operative to generate an attention time, attention weather, and an attention vehicle condition as part of said attention condition.

The notifying unit 5 includes a display unit 5a and a speaker unit 5b, and is operative to provide the vehicle driver with the attention status information element. More specifically, the notifying unit 5 is designed to provide the vehicle driver with the attention status information element in accordance with the notification instruction contained in the attention status information element, which will be describe later.

The display unit 5a is operative to display the attention position of the attention status information element on a road map with character information indicative of the attention status information element. The speaker unit 5b is operative to acoustically output a sound indicative of the attention status information element.

The storage unit 9 includes a storage medium such as, for example, a hard disk, and is operative to store therein one or more attention status information elements generated by the attention status information generating unit 3. As described above, each of the attention status information elements has an attention position, an attention condition, and, if necessary, a notification instruction. The attention condition includes an attention time, an attention weather, and an attention vehicle condition. The attention position includes a position where a vehicle encountered a dangerous situation. The attention time of the attention condition includes a time when the vehicle encountered the dangerous situation. The attention weather of the attention condition includes weather when the vehicle encountered the dangerous situation. The attention vehicle condition of the attention condition includes a vehicle condition when the vehicle encountered the dangerous situation. This means that the attention position may include a position where a vehicle encountered a risk of a traffic accident, and the attention time, attention weather, and the attention vehicle condition of the attention condition may include a time, weather, and a vehicle condition where a vehicle encountered a risk of a traffic accident.

The judging unit 4 is operative to judge whether or not the vehicle driver's attention is to be attracted on the basis of the current vehicle status information obtained by the current status information obtaining unit 2 and each of the attention status information elements stored in the storage unit 9.

The judging unit 4 includes a position judging section, not shown, for judging whether or not the distance between the current position of the current vehicle status information obtained by the current status information obtaining unit 2 and the attention position of each of the attention status information elements stored in the storage unit 9 is less than a predetermined threshold distance, and a condition judging section, not shown, for judging whether or not the vehicle driver's attention is to be attracted on the basis of the current condition of the current vehicle status information obtained by the current status information obtaining unit 2 and the attention condition of the attention status information element stored in the storage unit 9 when the position judging section of the judging unit 4 judges that the distance between the current position of the current vehicle status information obtained by the current status information obtaining unit 2 and the attention position of the attention status information element is less than the predetermined threshold distance. The condition judging section of the judging unit 4 is operative to judge whether or not the vehicle driver's attention is to be attracted in consideration of the current time, the current weather, and the current vehicle condition of the current vehicle status information obtained by the current status information obtaining unit 2 and the attention time, the attention weather, and the attention vehicle condition of the attention condition of the attention status information element whose attention position has been previously judged by the position judging section of the judging unit 4.

The notification control unit 6 is operative to control the notifying unit 5 to have the notifying unit 5 provide the vehicle driver with the attention status information element stored in the storage unit 9 and whose attention condition has been previously judged when the judging unit 4 judges that the vehicle driver's attention is to be attracted.

The operation of the first embodiment of the safe driving assisting apparatus 10 according to the present invention will be described hereinlater with reference to FIGS. 2 and 3.

In the step S101, the current vehicle status information is obtained by the current status information obtaining unit 2.

The step S101 goes forward to the step S102, in which it is judged by the judging unit 4 whether or not the vehicle approaches to one of the attention points, i.e., the distance between the current position of the current vehicle status information obtained by the current status information obtaining unit 2 and the attention position of each of the attention status information elements is less than a predetermined threshold distance. The predetermined threshold distance may be set at any distance such as, for example, one meter, ten meters, hundred meters, or the like. As shown in FIG. 3, when it is judged that the distance between the current position, designated by the legend A, of the current vehicle status information obtained by the current status information obtaining unit 2 and the attention position, designated by the legend B, of one of the attention status information elements is less than the predetermined threshold distance, i.e., L (m), the step S102 goes forward to the step S103. When it is, on the other hand, judged that the distance between the current position of the current vehicle status information obtained by the current status information obtaining unit 2 and the attention position of each of the attention status information elements is not less than the predetermined threshold distance, the step S102 goes back to the step S101.

In the step S103, it is judged by the judging unit 4 whether or not the current time of the current vehicle status information obtained by the current status information obtaining unit 2 matches with the attention time of the attention status information element whose attention position has been judged in the step S102. The word "the current time matches with the attention time" appearing hereinabove is intended to mean that the difference between the current time and the attention time is less than a predetermined threshold time. The predetermined threshold time may be set at any time value such as, for example, ten minutes, one hour, three hours, or the like. When it is judged that the current time of the current vehicle status information obtained by the current status information obtaining unit 2 matches with the attention time of the attention status information element, the step S103 goes forward to the step S104. When it is, on the other hand, judged that the current time of the current vehicle status information obtained by the current status information obtaining unit 2 does not match with the attention time of the attention status information element, the step S103 goes back to the step S101.

In the step S104, it is judged by the judging unit 4 whether or not the current weather of the current vehicle status information obtained by the current status information obtaining unit 2 matches with the attention weather of the attention status information element whose attention time has been judged in the step S103. The word "the current weather matches with the attention weather" appearing hereinabove is intended to mean that the current weather matches with the attention weather with respect to a predetermined condition. The predetermined condition may include, for example, weather, temperature, humidity, direction of the wind, or any combination thereof. When it is judged that the current weather of the current vehicle status information obtained by the current status information obtaining unit 2 matches with the attention weather of the attention status information element, the step S104 goes forward to the step S105. When it is, on the other hand, judged that the current weather of the current vehicle status information obtained by the current status information obtaining unit 2 does not match with the attention weather of the attention status information element, the step S104 goes back to the step S101.

In the step S105, it is judged whether or not the current vehicle condition of the current vehicle status information obtained by the current status information obtaining unit 2 matches with the attention vehicle condition of the attention status information element whose attention weather has been judged in the step S104. The word "the current vehicle condition matches with the attention vehicle condition" appearing hereinabove is intended to mean that the current vehicle condition matches with the attention vehicle condition with respect to a predetermined condition. The predetermined condition may include, for example, a vehicle speed, a steering angle, the operations of the winker lamp and the brake mechanism, or any combination thereof. When it is judged that the current vehicle condition of the current vehicle status information obtained by the current status information obtaining unit 2 matches with the attention vehicle condition of the attention status information element, the step S105 goes forward to the step S106. When it is, on the other hand, judged that the current vehicle condition of the current vehicle status information obtained by the current status information obtaining unit 2 does not match with the attention vehicle condition of the attention status information element, the step S105 goes back to the step S101.

In the step S106, the notification control unit 6 is operated to detect the notification instruction contained in the attention status information element whose attention vehicle condition has been judged in the step S105 and judge whether or not the attention information is to be notified by the speaker unit 5b. When it is judged that the attention status information element is to be notified by the speaker unit 5b, the step S106 goes forward to the step S107. When it is, on the other hand, judged that the attention status information element is not to be notified by the speaker unit 5b, the step S106 goes forward to the step S108.

In the step S107, the speaker unit 5b is operated to acoustically output a sound indicative of the attention status information element whose attention vehicle condition has been judged in the step S105 in accordance with the notification instruction contained in the attention status information element. The sound acoustically outputted by the speaker unit 5b may be, for example, "Caution!—Children Run into the Street". The sound acoustically outputted by the speaker unit 5b is determined in accordance with the notification instruction.

In the step S108, the display unit 5a is operated to display character information indicative of the attention status information element whose attention vehicle condition has been judged in the step S105 in accordance with the notification instruction contained in the attention status information element. Similar to the speaker unit 5b, the character information displayed on the display unit 5a is determined in accordance with the notification instruction. The display unit 5a may be operated to display the attention position of the attention status information element on a road map with the character information or display the attention position of the attention status information element on a road map alone. While it has been described in the above that the notification control unit 6 may be operated to judge whether or not the attention information is to be notified by the speaker unit 5b in the step S106, it is of course needless to mention that the notification control unit 6 may be operated to judge whether or not the attention information is to be notified by the display unit 5a in the step S106.

While it has been described in the above that the notification instruction is contained in each of the attention status information elements, in the safe driving assisting apparatus according to the present invention may be constituted by any other element as long as the vehicle driver may any time have the inputting unit 7 input the notification instruction, and the notification control unit 6 can detect the notification instruction.

The safe driving assisting apparatus 10 thus constructed makes it possible for the attention information to be notified by the speaker unit 5b while, for example, the vehicle driver is driving the vehicle so that the vehicle driver does not look away from the driving, and to be notified by the display unit 5a while the vehicle is parked so that the vehicle driver can carefully recognize the attention position with the character information.

As will be understood from the foregoing description, the first embodiment of the safe driving assisting apparatus according to the present invention, comprising: attention status information generating means for generating one or more attention status information elements each having an attention position and an attention condition; information providing means for providing the vehicle driver with the attention status information elements generated by the attention status information generating means; information obtaining means for obtaining current vehicle status information having a current position and a current condition; judging means for judging whether or not the vehicle driver's attention is to be attracted on the basis of the current vehicle status information obtained by the information obtaining means and each of the attention status information elements generated by the attention status information generating means; and controlling means for controlling the information providing means to have the information providing means provide the vehicle driver with one of the attention status information elements generated by the attention status information generating means when the judging means judges that the vehicle driver's attention is to be attracted, can provide the vehicle driver with attention information to attract vehicle driver's attention when and where the vehicle driver is required to pay careful attention to driving, thereby ensuring that the vehicle driver does not neglect the attention information.

Figure 4:
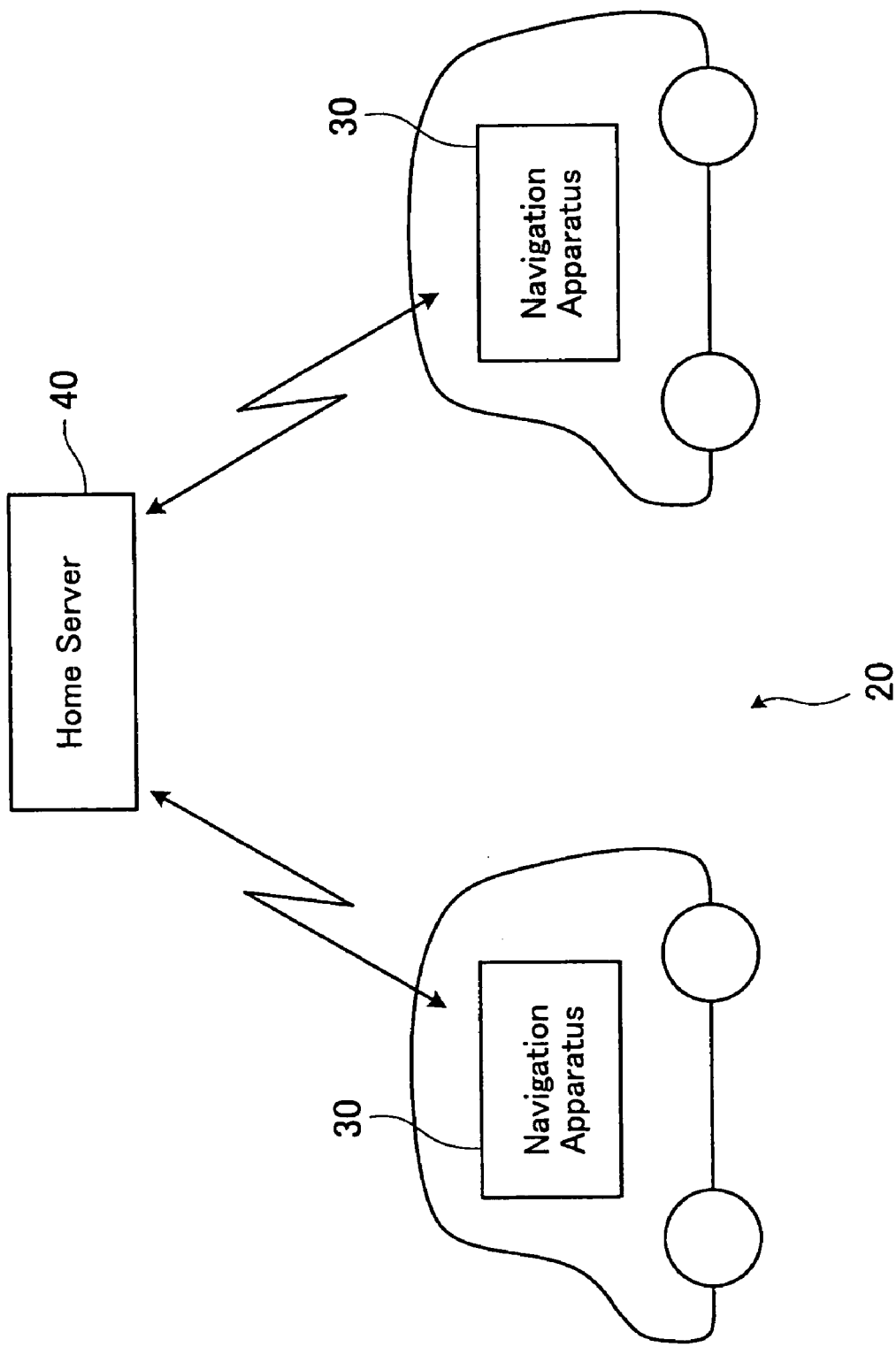
FIG. 4 is a schematic diagram of a second preferred embodiment of a safe driving assisting system according to the present invention.

Referring then to FIGS. 4 through 7 of the drawings, there is shown a second preferred embodiment of a safe driving assisting system 20 according to the present invention. The safe driving assisting system 20 is shown in FIG. 4 as comprising a safe driving assisting server as a home server 40 and one or more safe driving assisting apparatus as navigation apparatuses 30.

Figure 5:
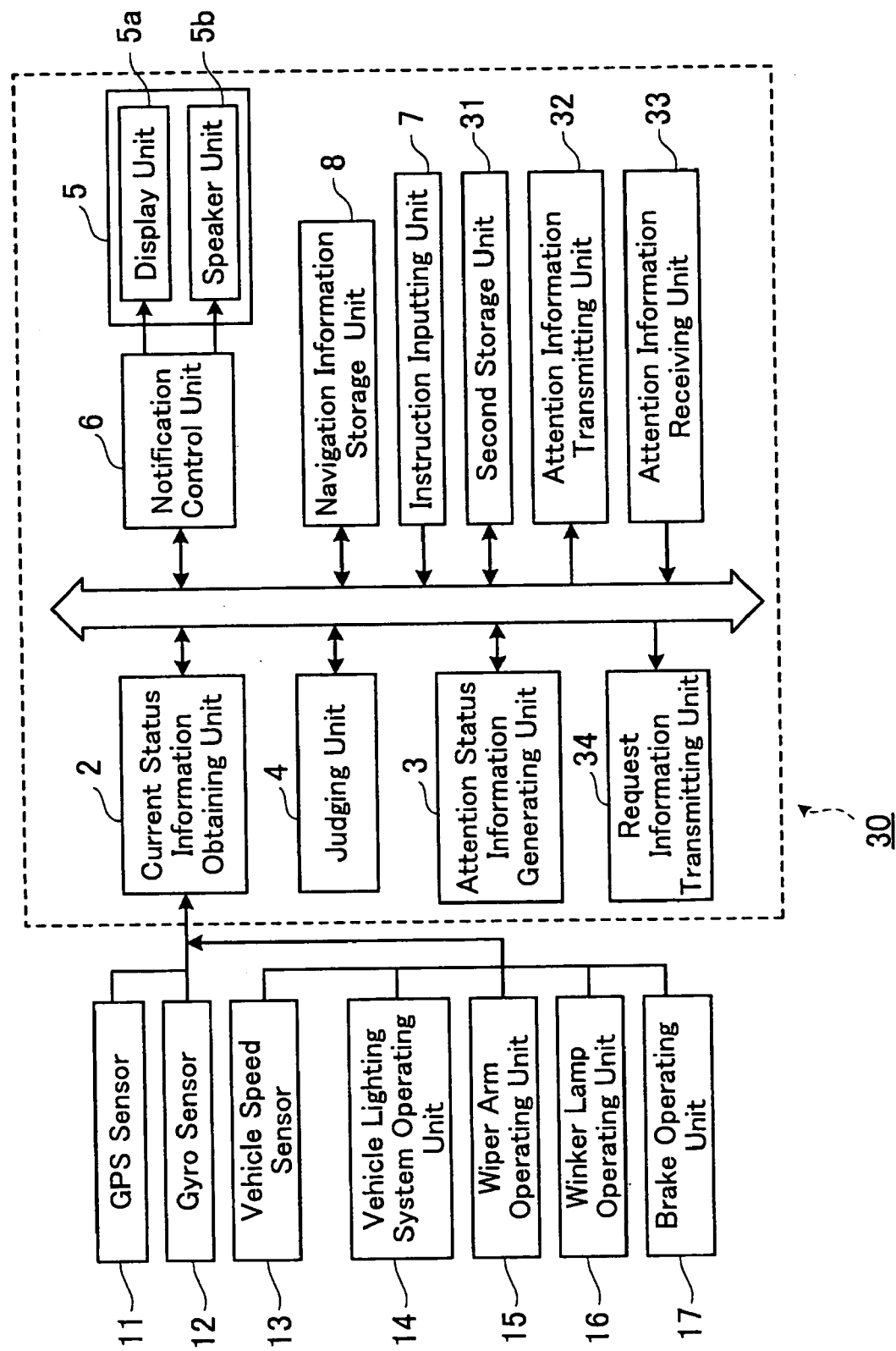
FIG. 5 is a block diagram of a safe driving assisting apparatus forming part of the second embodiment of the safe driving assisting system shown in FIG. 4.

The constitutional elements of the safe driving assisting apparatus 30 as shown in FIG. 5 is the same as the first embodiment of the safe driving assisting apparatus 10 except for the constitutional elements appearing in the following description. The constitutional elements of the safe driving assisting apparatus 30 the same as those of the first embodiment of the safe driving assisting apparatus 10 will not be described but bear the same reference numerals and legends as those of the first embodiment of the safe driving assisting apparatus 10 to avoid tedious repetition.

The following description will be directed to the constitutional elements of the safe driving assisting apparatus 30 different from those of the first embodiment of the safe driving assisting apparatus 10.

The safe driving assisting apparatus 30 constituting the safe driving assisting system 20 is shown in FIG. 5 as comprising attention information obtaining means constituted by an attention information receiving unit 33 for obtaining one or more attention status information elements transmitted by an attention information transmitting unit 43 of the safe driving assisting server 40, which will be described later, information providing means constituted by a notifying unit 5 for providing the vehicle driver with the attention status information elements obtained by the attention information receiving unit 33, information obtaining means constituted by a current status information obtaining unit 2 for obtaining current vehicle status information having a current position and a current condition, judging means constituted by a judging unit 4 for judging whether or not the vehicle driver's attention is to be attracted on the basis of the current vehicle status information obtained by the current status information obtaining unit 2 and each of the attention status information elements obtained by the attention information receiving unit 33, and controlling means constituted by a notification control unit 6 for controlling the notifying unit 5 to have the notifying unit 5 provide the vehicle driver with one of the attention status information elements obtained by the attention information receiving unit 33 when the judging unit 4 judges that the vehicle driver's attention is to be attracted.

The safe driving assisting apparatus 30 constituting the safe driving assisting system 20 further comprises a second storage unit 31, an attention information transmitting unit 32, and a request information transmitting unit 34.

The second storage unit 31 is operative to temporally store therein the attention status information elements generated by the attention status information generating unit 3. As described above, each of the attention status information elements has an attention position, an attention condition, and a notification instruction.

The attention information transmitting unit 32 is operative to transmit the attention status information elements temporally stored by the second storage unit 31 to the safe driving assisting server 40. The instruction inputting unit 7 is operative to input a driver request signal from an operator such as, for example, a vehicle driver, or the like. The request information transmitting unit 34 is operative to transmit a request signal for attention status information elements to the safe driving assisting server 40 in response to the driver request signal inputted by the instruction inputting unit 7.

Figure 6:
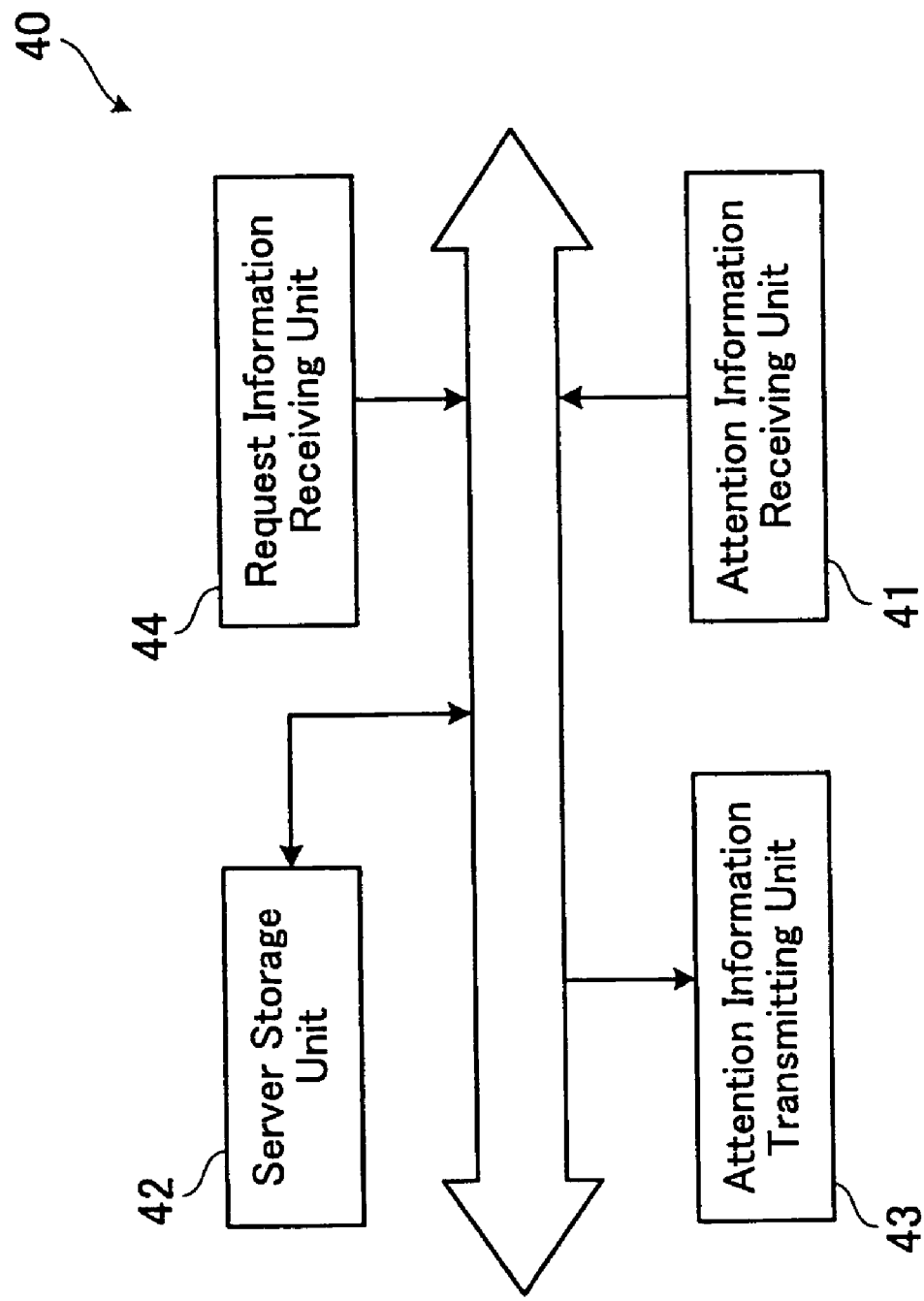
FIG. 6 is a block diagram of a safe driving assisting server forming part of the second embodiment of the safe driving assisting system shown in FIG. 4.

As shown in FIG. 6, the safe driving assisting server 40 comprises storage means constituted by a server storage unit 42 for storing therein one or more attention status information elements each having an attention position and an attention condition; and attention information transmitting means constituted by an attention information transmitting unit 43 for transmitting the attention status information elements stored in the server storage unit 42. The server storage unit 42 has stored therein an attention time, an attention weather, and an attention vehicle condition as part of the attention condition. Preferably, the safe driving assisting server 40 should be a home server installed at home.

The safe driving assisting server 40 further comprises an attention information receiving unit 41 for receiving the attention status information elements transmitted by the attention information transmitting unit 32 of the safe driving assisting apparatus 30, and a request information receiving unit 44 for receiving the request signal transmitted by the request information transmitting unit 34 of the safe driving assisting apparatus 30. Preferably, the safe driving assisting server 40 should communicate with the safe driving assisting apparatus 30 by means of a publicly available communication network.

The judging unit 4 of the safe driving assisting apparatus 30 is operative to judge whether or not the vehicle driver's attention is to be attracted on the basis of the current vehicle status information obtained by the current status information obtaining unit 2 and each of the attention status information elements obtained by the attention information receiving unit 33. The notification control unit 6 of the safe driving assisting apparatus 30 is operative to control the notifying unit 5 to have the notifying unit 5 provide the vehicle driver with one of the attention status information elements obtained by the attention information receiving unit 33 when the judging unit 4 judges that the vehicle driver's attention is to be attracted.

In the safe driving assisting system 20 thus constructed as previously mentioned, the safe driving assisting apparatus 30 does not need to have a storage unit for storing therein attention status information elements because of the fact that the safe driving assisting server 40 comprises a server storage unit, thereby making it possible for the safe driving assisting apparatus 30 to be simple in construction and inexpensive in production cost.

Figure 7:
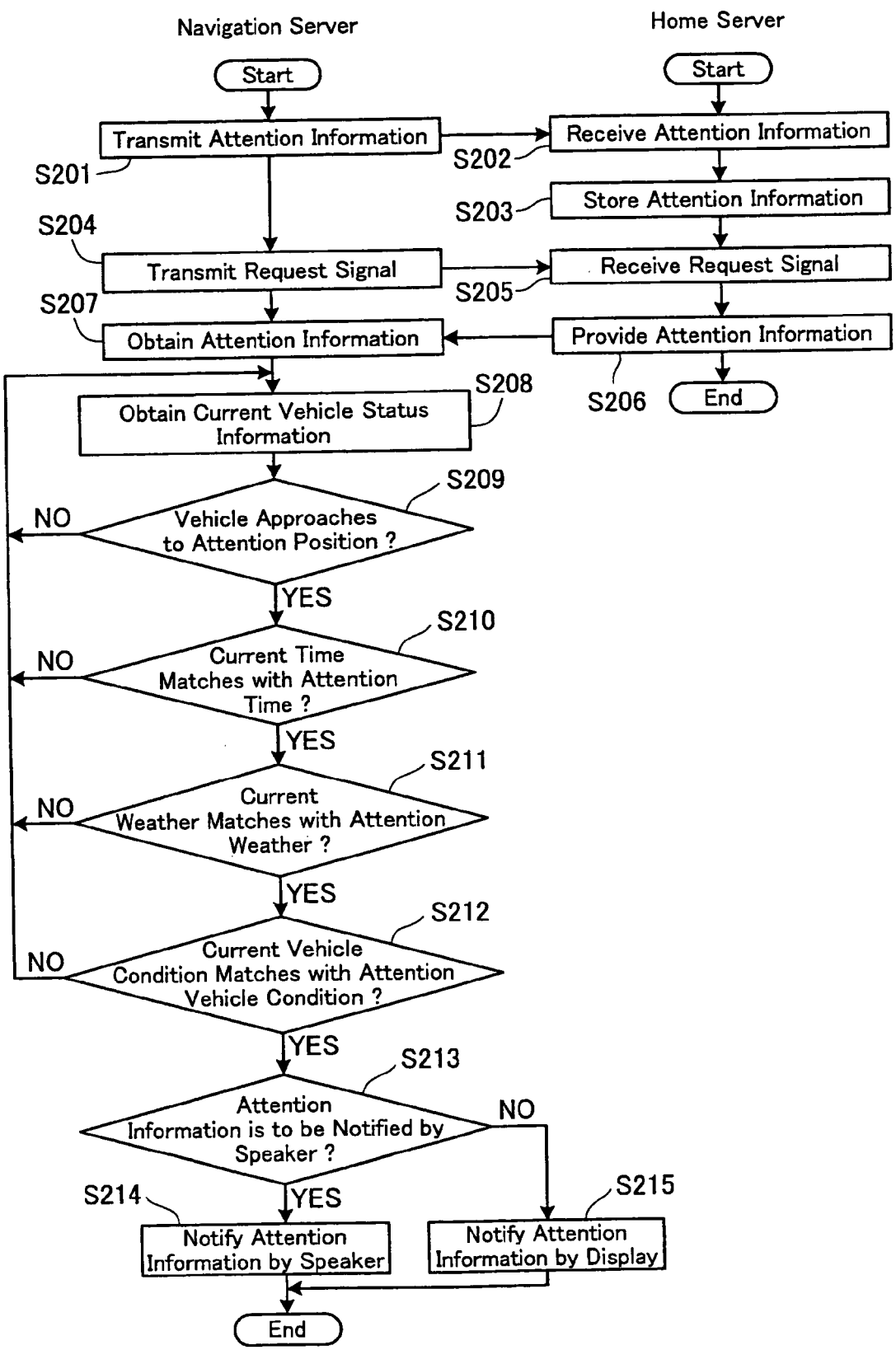
FIG. 7 is a flowchart showing the process performed by the second embodiment of the safe driving assisting system according to the present invention.
Figure 8:
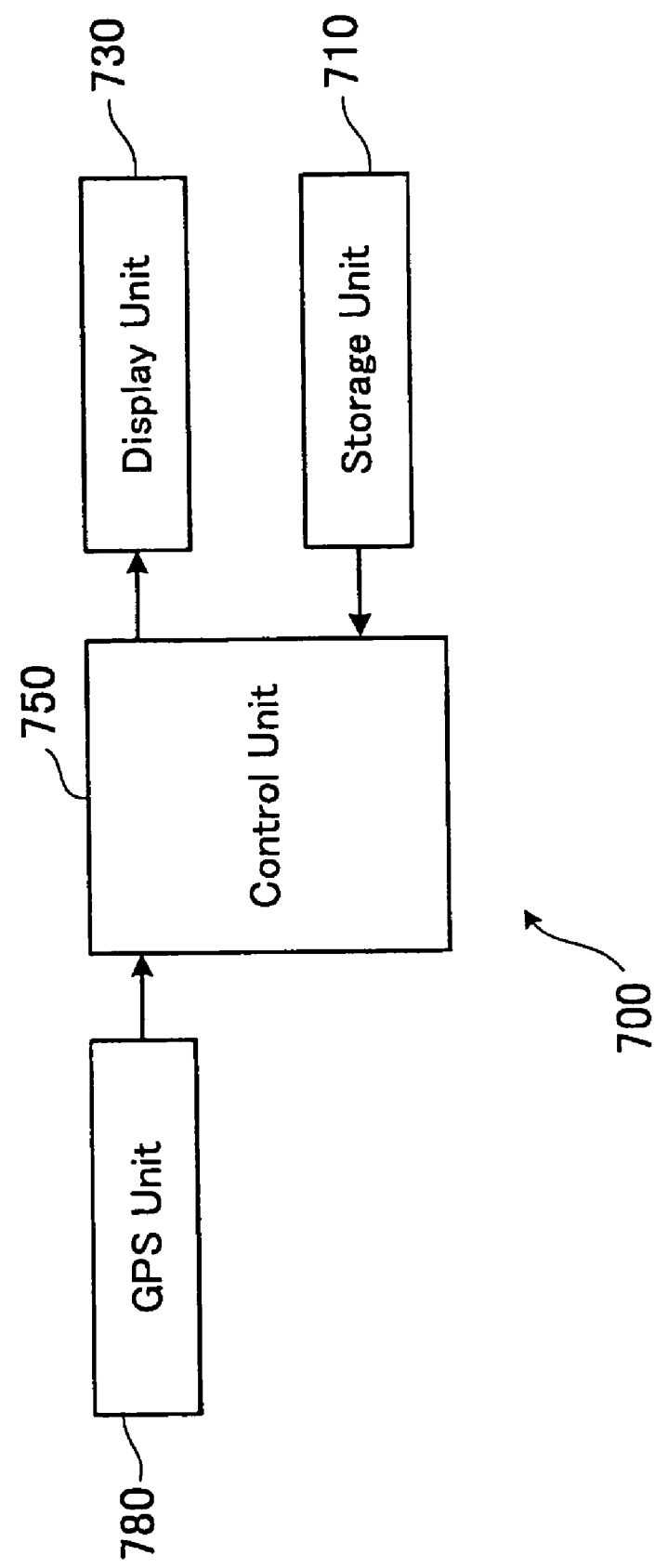
FIG. 8 is a block diagram of a conventional driving assisting apparatus.

The operation of the second embodiment of the safe driving assisting system according to the present invention will be described hereinlater with reference to FIG. 7.

In the step S201, the attention information transmitting unit 32 of the safe driving assisting apparatus 30 is operated to transmit the attention status information elements temporally stored by the second storage unit 31 to the safe driving assisting server 40 in response to the instruction signal inputted by the instruction inputting unit 7. It is needless to mention that the attention information transmitting unit 32 may be operated to automatically transmit the attention status information elements temporally stored by the second storage unit 31 on the basis of on the basis of the current vehicle status information obtained by the current status information obtaining unit 2 without the instruction signal inputted by the instruction inputting unit 7. This means that the attention information transmitting unit 32 may be operated to automatically transmit the attention status information elements temporally stored by the second storage unit 31 when, for example, the current status information obtaining unit 2 senses that the vehicle suddenly brakes on the basis of the vehicle speed detected by he vehicle speed sensor 13.

The step S201 goes forward to the step S202. In the step S202, the attention information receiving unit 41 of the safe driving assisting server 40 is operated to receive the attention status information elements transmitted by the attention information transmitting unit 32 of the safe driving assisting apparatus 30.

The step S202 goes forward to the step S203, in which the server storage unit 42 is operated to store therein the attention status information elements received by the attention information receiving unit 41.

In the step S204, the request information transmitting unit 34 of the safe driving assisting apparatus 30 is operated to transmit a request signal for attention status information elements to the safe driving assisting server 40 in response to the driver request signal inputted by the instruction inputting unit 7.

The step S204 goes forward to the step S205, in which the request information receiving unit 44 of the safe driving assisting server 40 is operated to receive the request signal transmitted by the request information transmitting unit 34 of the safe driving assisting apparatus 30.

The step S205 goes forward to the step S206, in which the attention information transmitting unit 43 is operative to transmit the attention status information elements stored in the server storage unit 42 in response to the request signal received by the request information receiving unit 44.

The step S206 goes forward to the step S207, in which the attention information receiving unit 33 of the safe driving assisting apparatus 30 is operated to receive the attention status information elements transmitted by the attention information transmitting unit 43.

The step S207 goes forward to the step S208, in which the current vehicle status information is obtained by the current status information obtaining unit 2.

The step S208 goes forward to the step S209, in which it is judged by the judging unit 4 whether or not the vehicle approaches to one of the attention positions, i.e., the distance between the current position of the current vehicle status information obtained by the current status information obtaining unit 2 and the attention position of each of the attention status information elements is less than a predetermined threshold distance. The predetermined threshold distance may be set at any distance such as, for example, one meter, ten meters, hundred meters, or the like. When it is judged that the distance between the current position of the current vehicle status information obtained by the current status information obtaining unit 2 and the attention position of one of the attention status information elements is less than the predetermined threshold distance, the step S209 goes forward to the step S210. When it is, on the other hand, judged that the distance between the current position of the current vehicle status information obtained by the current status information obtaining unit 2 and the attention position of each of the attention status information elements is not less than the predetermined threshold distance, the step S209 goes back to the step S208.

In the step S210, it is judged by the judging unit 4 whether or not the current time of the current vehicle status information obtained by the current status information obtaining unit 2 matches with the attention time of the attention status information element whose attention position has been judged in the step S209. The word "the current time matches with the attention time" appearing hereinabove is intended to mean that the difference between the current time and the attention time is less than a predetermined threshold time. The predetermined threshold time may be set at any time value such as, for example, ten minutes, one hour, three hours, or the like. When it is judged that the current time of the current vehicle status information obtained by the current status information obtaining unit 2 matches with the attention time of the attention status information element, the step S210 goes forward to the step S211. When it is, on the other hand, judged that the current time of the current vehicle status information obtained by the current status information obtaining unit 2 does not match with the attention time of the attention status information element, the step S210 goes back to the step S208.

In the step S211, it is judged by the judging unit 4 whether or not the current weather of the current vehicle status information obtained by the current status information obtaining unit 2 matches with the attention weather of the attention status information element whose attention time has been judged in the step S210. The word "the current weather matches with the attention weather" appearing hereinabove is intended to mean that the current weather matches with the attention weather with respect to a predetermined condition. The predetermined condition may include, for example, weather, temperature, humidity, direction of the wind, or any combination thereof. When it is judged that the current weather of the current vehicle status information obtained by the current status information obtaining unit 2 matches with the attention weather of the attention status information element, the step S211 goes forward to the step S212. When it is, on the other hand, judged that the current weather of the current vehicle status information obtained by the current status information obtaining unit 2 does not match with the attention weather of the attention status information element, the step S211 goes back to the step S208.

In the step S212, it is judged whether or not the current vehicle condition of the current vehicle status information obtained by the current status information obtaining unit 2 matches with the attention vehicle condition of the attention status information element whose attention weather has been judged in the step S211. The word "the current vehicle condition matches with the attention vehicle condition" appearing hereinabove is intended to mean that the current vehicle condition matches with the attention vehicle condition with respect to a predetermined condition. The predetermined condition may include, for example, a vehicle speed, a steering angle, the operations of the winker lamp and the brake mechanism, or any combination thereof. When it is judged that the current vehicle condition of the current vehicle status information obtained by the current status information obtaining unit 2 matches with the attention vehicle condition of the attention status information element, the step S212 goes forward to the step S213. When it is, on the other hand, judged that the current vehicle condition of the current vehicle status information obtained by the current status information obtaining unit 2 does not match with the attention vehicle condition of the attention status information element, the step S212 goes back to the step S208.

In the step S213, the notification control unit 6 is operated to detect the notification instruction contained in the attention status information element whose attention vehicle condition has been judged in the step S212 and judge whether or not the attention information is to be notified by the speaker unit 5b. When it is judged that the attention status information element is to be notified by the speaker unit 5b, the step S213 goes forward to the step S214. When it is, on the other hand, judged that the attention status information element is not to be notified by the speaker unit 5b, the step S213 goes forward to the step S215.

In the step S214, the speaker unit 5b is operated to acoustically output a sound indicative of the attention status information element whose attention vehicle condition has been judged in the step S212 in accordance with the notification instruction contained in the attention status information element. The sound acoustically outputted by the speaker unit 5b may be, for example, "Caution!—Children Run into the Street". The sound acoustically outputted by the speaker unit 5b is determined in response to the notification instruction.

In the step S215, the display unit 5a is operated to display character information indicative of the attention status information element whose attention vehicle condition has been judged in the step S212 in accordance with the notification instruction contained in the attention status information element. Similar to the speaker unit 5b, the character information displayed on the display unit 5a is determined in accordance with the notification instruction. The display unit 5a may be operated to display the attention position of the attention status information element on a road map with the character information. While it has been described in the above that the notification control unit 6 may be operated to judge whether or not the attention information is to be notified by the speaker unit 5b in the step S213, it is of course needless to mention that the notification control unit 6 may be operated to judge whether or not the attention information is to be notified by the display unit 5a in the step S213.

As will be understood from the foregoing description, the second embodiment of the safe driving assisting system according to the present invention, comprising a safe driving assisting server for assisting a vehicle driver in safely driving a vehicle, including: storage means for storing therein one or more attention status information elements each having an attention position and an attention condition; and attention information transmitting means for transmitting the attention status information elements stored in the storage means; and a safe driving assisting apparatus including: attention information obtaining means for obtaining the attention status information elements transmitted by the attention information transmitting means of the safe driving assisting server; information providing means for providing the vehicle driver with the attention status information elements obtained by the attention information obtaining means; information obtaining means for obtaining current vehicle status information having a current position and a current condition; judging means for judging whether or not the vehicle driver's attention is to be attracted on the basis of the current vehicle status information obtained by the information obtaining means and each of the attention status information elements obtained by the attention information obtaining means; and controlling means for controlling the information providing means to have the information providing means provide the vehicle driver with one of the attention status information elements obtained by the attention information obtaining means when the judging means judges that the vehicle driver's attention is to be attracted, can provide the vehicle driver with attention information to attract vehicle driver's attention when and where the vehicle driver is required to pay careful attention to driving, thereby ensuring that the vehicle driver does not neglect the attention information.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. A safe driving assisting apparatus for assisting a vehicle driver in safely driving a vehicle, comprising: an attention status information generating means for generating attention status information elements each having an attention position and an attention condition; information providing means for providing said vehicle driver with said attention status information elements generated by said attention status information generating means; information obtaining means for obtaining current vehicle status information having a current position and a current condition; judging means for judging whether or not said vehicle driver's attention is to be attracted on the basis of said current vehicle status information obtained by said information obtaining means and each of said attention status information elements generated by said attention status information generating means; a request information transmitting unit and controlling means for controlling said information providing means to have said information providing means provide said vehicle driver with one of said attention status information elements generated by said attention status information generating means when said judging means judges that said vehicle driver's attention is to be attracted, wherein said request information transmitting unit request information from a safe driving assembly home server in response to a driver request signal.

2. A safe driving assisting apparatus as set forth in claim 1, in which said judging means includes a position judging section for judging whether or not the distance between said current position of said current vehicle status information obtained by said information obtaining means and said attention position of each of said attention status information elements is less than a predetermined threshold distance, and a condition judging section for judging whether or not said vehicle driver's attention is to be attracted on the basis of said current condition of said current vehicle status information obtained by said information obtaining means and said attention condition of said attention status information element generated by said attention status information generating means when said position judging section judges that the distance between said current position of said current vehicle status information obtained by said information obtaining means and said attention position of said attention status information element is less than a predetermined threshold distance, said controlling means is operative to control said information providing means to have said information providing means provide said vehicle driver with said attention status information element generated by said attention status information generating means when said judging means judges that said vehicle driver's attention is to be attracted.

3. A safe driving assisting apparatus as set forth in claim 2, in which said attention status information generating means is operative to generate an attention time and an attention weather as part of said attention condition, said information obtaining means is operative to obtain a current time and a current weather as part of said current condition, and said condition judging section is operative to judge whether or not said vehicle driver's attention is to be attracted in consideration of said current time and said current weather of said current vehicle status information obtained by said information obtaining means and said attention time and said attention weather of said attention status information element generated by said attention status information generating means.

4. A safe driving assisting apparatus as set forth in claim 2, in which said attention status information generating means is operative to generate an attention vehicle condition as part of said attention condition, said information obtaining means is operative to obtain a current vehicle condition as part of said current condition, and said condition judging section is operative to judge whether or not said vehicle driver's attention is to be attracted in consideration of said current vehicle condition of said current vehicle status information obtained by said information obtaining means and said attention vehicle condition of said attention status information element generated by said attention status information generating means.

5. A safe driving assisting apparatus as set forth in claim 1, in which said information providing means includes a speaker unit for acoustically outputting a sound indicative of said attention status information element.

6. A safe driving assisting apparatus as set forth in claim 1, in which said information providing means includes a display unit for displaying character information indicative of said attention status information element.

7. A safe driving assisting apparatus as set forth in claim 1, in which said information providing means includes a display unit for displaying said attention position on a road map.

8. A safe driving assisting apparatus as set forth in claim 1, in which said attention position includes a position where a vehicle encountered a dangerous situation.

9. A safe driving assisting apparatus as set forth in claim 1, in which said attention time of said attention condition includes an attention time when a vehicle encountered a dangerous situation.

10. A safe driving assisting apparatus as set forth in claim 1, in which said attention weather of said attention condition includes an attention weather when a vehicle encountered a dangerous situation.

11. A safe driving assisting home server for assisting a vehicle driver in safely driving a vehicle, comprising: storage means for storing therein one or more attention status information elements each having an attention position and an attention condition; a request information receiving unit; and attention information transmitting means for transmitting said attention status information elements stored in said storage means, wherein said request information receiving unit receives requests for one or more attention status information elements from a safe driving assisting apparatus.

12. A safe driving assisting home server as set forth in claim 11, in which said storage means is operative to store therein an attention time and an attention weather as part of said attention condition.

13. A safe driving assisting home server as set forth in claim 11, in which said storage means is operative to store therein an attention vehicle condition as part of said attention condition.

14. A safe driving assisting system for assisting a vehicle driver in safely driving a vehicle, comprising: a safe driving assisting home server for assisting a vehicle driver in safely driving a vehicle, including: storage means for storing therein one or more attention status information elements each having an attention position and an attention condition; a request information receiving unit; and attention information transmitting means for transmitting said attention status information elements stored in said storage means; and a safe driving assisting apparatus including: attention information obtaining means for obtaining said attention status information elements transmitted by said attention information transmitting means of said safe driving assisting home server; information providing means for providing said vehicle driver with said attention status information elements obtained by said attention information obtaining means; information obtaining means for obtaining current vehicle status information having a current position and a current condition; judging means for judging whether or not said vehicle driver's attention is to be attracted on the basis of said current vehicle status information obtained by said information obtaining means and each of said attention status information elements obtained by said attention information obtaining means; a request information transmitting unit and controlling means for controlling said information providing means to have said information providing means provide said vehicle driver with one of said attention status information elements obtained by said attention information obtaining means when said judging means judges that said vehicle driver's attention is to be attracted, wherein said request information receiving unit receives requests from said request information transmitting unit in response to a driver recluest signal.

15. A safe driving assisting system as set forth in claim 14, in which said storage means of said safe driving assisting home server is operative to store therein an attention time and an attention weather as part of said attention condition.

16. A safe driving assisting system as set forth in claim 14, in which said storage means of said safe driving assisting home server is operative to store therein an attention vehicle condition as part of said attention condition.

17. A safe driving assisting system as set forth in claim 14, in which said information providing means includes a speaker unit for acoustically outputting a sound indicative of said attention status information.

18. A safe driving assisting system as set forth in claim 14, in which said information providing means includes a display unit for displaying character information indicative of said attention status information.

19. A safe driving assisting system as set forth in claim 14, in which said information providing means includes a display unit for displaying said attention position of said attention status information element on a road map.

* * * * *

UNITED STATES PATENT AND TRADEMARK OFFICE
CERTIFICATE OF CORRECTION

PATENT NO.          : 7,174,248 B2
APPLICATION NO. : 10/704726
DATED                   : February 6, 2007
INVENTOR(S)         : Masahiro Suzuki It is certified that error appears in the above-identified patent and that said Letters Patent is hereby corrected as shown below:

Column 16, line 34: Please insert an --s-- at the end of the word "request".

Signed and Sealed this

Twelfth Day of June, 2007

JON W. DUDAS
*Director of the United States Patent and Trademark Office*